(12) United States Patent
Huelsewiesche (10) Patent No.: US 6,820,358 B1
(45) Date of Patent: Nov. 23, 2004

(54) COMPACT VEHICLE FOR COMPOSTING MANURE STORAGE UNDER HIGH-RISE AVIAN HOUSES

(76) Inventor: Louie Huelsewiesche, 139 Cypress Lake Dr., Statesboro, GA (US) 30458

( * ) Notice: Subject to any disclaimer, the term of this patent is extended or adjusted under 35 U.S.C. 154(b) by 0 days.

(21) Appl. No.: 10/342,107

(22) Filed: Jan. 13, 2003

Related U.S. Application Data
(60) Provisional application No. 60/348,826, filed on Jan. 14, 2002.

(51) Int. Cl.[7] .............................. E02F 3/08; E02F 3/24; E02F 3/76; E02F 5/22
(52) U.S. Cl. .................... 37/407; 37/142.5; 37/189; 37/462; 172/119; 172/123
(58) Field of Search ............................ 37/142.5, 189, 37/462, 465, 403, 407, 469, 410, 337, 338, 347, 350, 352, 365, 386, 388, 244–262; 172/35, 118, 119, 123; 119/201, 202, 442, 451, 479

(56) References Cited

U.S. PATENT DOCUMENTS

| | | | |
|---|---|---|---|
| 3,503,450 A | 3/1970 | Day ........................... | 172/71 |
| 3,580,257 A | 5/1971 | Teague ....................... | 130/24 |
| 3,662,420 A | 5/1972 | Jordan, Jr. ................... | 15/93 B |
| 3,721,214 A | 3/1973 | Staples et al. ................ | 119/22 |
| 3,934,363 A | 1/1976 | McMurray ..................... | 37/82 |
| 3,994,083 A | 11/1976 | Cunningham .................. | 37/80 R |
| 4,864,748 A | 9/1989 | Boyer ......................... | 37/142.5 |
| 4,878,713 A | 11/1989 | Zanetis ........................ | 299/39 |
| 4,912,862 A | 4/1990 | Bishop et al. ................ | 37/142.5 |
| 5,353,529 A | 10/1994 | McCullough ................. | 37/142.5 |
| 5,749,114 A | 5/1998 | Miller, Jr. et al. ............ | 15/93.1 |
| 5,904,365 A | 5/1999 | Dillon ........................ | 280/419 |
| 6,342,085 B1 | 1/2002 | Giroux et al. ................. | 71/9 |

OTHER PUBLICATIONS

"Mighty Mike" product brochure of Frontier Industrial Corp. (Hubbard. OR: Dec. 31, 2001) (4 sheets).
Product brochure for front end attachment of Brown Bear Corp. (Corning. IA: undated) (4 sheets).

*Primary Examiner*—Christopher J. Novosad
(74) *Attorney, Agent, or Firm*—Jonathan A. Bay

(57) ABSTRACT

A compact self-propelled vehicle for composting windrows of compost material found in cramped confines has a low frame forming a central tunnel for mounting a flow-through conveyor. A front pick-up end has a central-flow auger system for attacking into the windrow end-on along the long axis thereof. The conveyor that has a lower intake end immediately trailing the central-flow auger system and a high discharge end for back-depositing the discharged material back into windrow formation. Hence central-flow auger system breaks apart, disintegrates and/or stirs the dug-into material while ultimately accomplishing transfer of it onto the conveyor. In essence, the vehicle worms its way through the windrow by virtue of the wheels rolling through a temporary and traveling void created between the leading pick-up end and the back-deposited material discharged by the discharge end of the conveyor.

22 Claims, 4 Drawing Sheets

Fig. 4

COMPACT VEHICLE FOR COMPOSTING MANURE STORAGE UNDER HIGH-RISE AVIAN HOUSES

CROSS-REFERENCE TO PROVISIONAL APPLICATION(S)

This application claims the benefit of U.S. Provisional Application No. 60/348,826, filed Jan. 14, 2002.

BACKGROUND OF THE INVENTION

1. Field of the Invention

The invention generally relates to apparatus for composting windrows of compost material and, more particularly, to a compact vehicle for composting windrows of compost material in exceptionally cramped confines or elsewhere where space is premium or maneuverability is paramount, such as and without limitation the situation with manure that collects under high-rise avian houses or the like.

Additional aspects and objects of the invention will be apparent in connection with the discussion further below of preferred embodiments and examples.

2. Prior Art

High-rise chicken houses have famous manure-management problems. The birds are kept in multi-story cages typically suspended from the ceilings. Their manure is allowed to fall and collect on the chicken-house floor. The ultimate end-disposal of the manure usually entails spreading it over crop fields as a soil additive including as for example fertilizer purposes. However, crop planting and harvesting cycles typically limit opportunities for manure spreading to perhaps just two times a year, coinciding once with crop planting and about a half year apart with crop harvesting. During the rest of the year the problem is what to do with the massively accumulating heap of manure. Nowadays it is popular to simply let the manure decompose in place on the chicken-house floor where it fell until, in cases for the earliest-dropped manure, six months later it can be spread out over fields.

The ground floors (or more particularly, the manure collection pits or areas) of such chicken houses are typically very cramped spaces. Ceiling heights might be less than seven feet (~2.1 m). Clearance between the column-rows of the building's columns might be just barely more than six feet (~1.8 m) apart. An example chicken house might measure 400 to 600 feet (120 to 180 m) long, and its ground floor might partitioned into two side-by-side aisles for manure collection measuring about six to ten feet (~1.8 to 3 m) wide each aisle. Preferably the manure is maintained there in windrows (ie., a windrow being an elongated heap or row having very approximately an inverted-V shaped cross-section). Over the six month or more lay-up period the manure might build up to a four foot (1.2 m) high windrow. Hence not only is space cramped in the manure-storage areas of high-rise chicken houses, but the build-up of the manure heap over time makes the free space tighter still if not virtually non-existent.

It is desirable to periodically aerate the manure heap on a more or less regular schedule, say for example several times a week. This aerating process preferably involves breaking-up and/or turning-over, stirring and so on in order to promote dehydration, reducing the weight and volume of the manure as well as odor. It is also significant that such "aerating" processes (including without limitation stirring, breaking apart, turning over and the like) tend to eliminate formation of a mucky wet bottom layer. Controlling or eliminating the formation of such a mucky wet bottom wet layer is important because if it is allowed to form, it gums up equipment badly when time comes to dig it out, and then it is not ready for spreading on fields until decontaminated (or otherwise the pathogens are somehow destroyed). Also, wet or unstirred manure if left untouched long enough breeds vast numbers of flies and other alarming organisms. Periodically aerating (eg., stirring etc.) the manure disrupts the ability of such flies and organisms to breed or subsist in the manure. Hence for all these reasons it is desirable to periodically compost the manure in the storage areas as by aerating or, in other words, break it apart, disintegrate it, stir it and/or turn it over and so on.

Enlisting prior art equipment to operated and maneuver in such cramped confines has been problematical. The prior art includes various windrow-composting attachments, some which are towed behind a drive vehicle and others which attach in front of the drive vehicle. One problem with prior art attachments is that most poorly operate in the restrictive confines described previously because most were designed for use outdoors where space was no problem. Hence, attachments which are towed typically have a line-of-action which is offset from the drive vehicle's driving lane because the drive vehicle cannot drive down the center of the windrow. In contrast, attachments to the front of the drive vehicle typically have an offset line-of-action, or in other words the front attachments typically shovels the manure to one side or the other of the drive vehicle's driving lane rather than back-depositing the material in-line on the axis it originally sat when originally dug into. Thus, such problems as small entrance doors and narrowly-spaced rows of structural columns severely handicap the usefulness of front or back attachment equipment. What is needed is a solution which overcomes the problems of the prior art.

A number of additional features and objects will be apparent in connection with the following discussion of preferred embodiments and examples.

SUMMARY OF THE INVENTION

It is an object of the invention to provide a compact vehicle for composting windrows of compost material found in exceptionally cramped confines or elsewhere where space is premium or maneuverability is paramount.

These and other objects and aspects of the invention are achieved in a compact self-propelled vehicle for composting windrows of compost material found in cramped confines. The vehicle preferably has a low frame extending between a front and back end such that the low frame forms an axially-elongated inverted-U shaped construction having depending flanges to flank a central tunnel. There are at least three wheels and these include at least left and right front wheels that are mounted on separate fixtures to eliminate a common continuous front axle for them and thereby avoid any such axle piercing the frame's central tunnel. The vehicle also has a leading or front pick-up end that is situated forward of the front wheels and has a transverse central-flow auger system for setting at ground elevation to attack into a windrow of material end-on along the long axis of such windrow. The vehicle further incorporates an inclined through-flow conveyor that has a material-carrying run extending between a forward lower intake end and an upper rearward discharge end. The intake end is preferably disposed immediately trailing a center portion of the central-flow auger system. The discharge end is preferably disposed to discharge the picked-up material rearwardly to clear the at least one other wheel and at a given elevation above the ground.

Given the foregoing, the central-flow auger system includes left and right oppositely-coiled helical flights mounted on a common shaft and spaced by a central paddle section. Therefore, material dug into by the helical flights is traversed, transited or shifted centrally to the central paddle section which kicks such material up onto the intake end of the conveyor. In the process, the material is broken apart, disintegrated and/or stirred by the helical flights on way to the central paddle section as well as by the central paddle section itself. The vehicle further includes a drive system incorporating a drive source for supplying drive power to the auger system, conveyor and at least selected ones of the wheels. In consequence, the vehicle can drive through the windrow of material end-on along the long axis of the windrow, digging up material with the leading pick-up section for shifting over towards and kicking up onto the intake end of the conveyor. Ultimately the picked-up material is back-deposited behind the vehicle in windrow formation to facilitate future passes by the vehicle at periodic intervals as well as to promote compost processes while undisturbed during such intervals.

In essence, the vehicle worms its way through the windrow by virtue of the wheels being disposed in a temporary and traveling void created between the leading pick-up end and the back-deposited material discharged by the discharge end of the conveyor.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
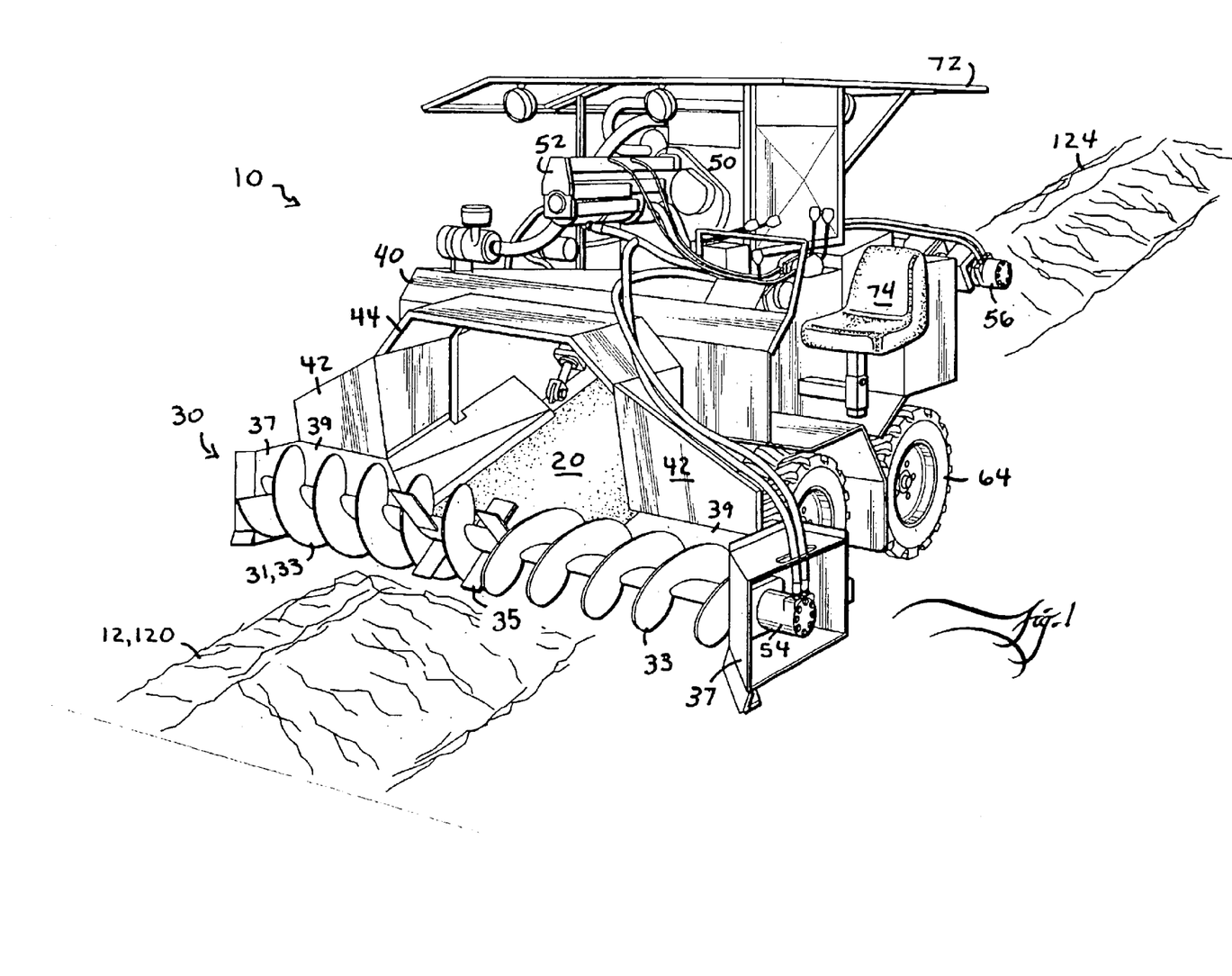
FIG. 1 is a perspective view of a compact vehicle in accordance with the invention for composting windrows of compost material found in exceptionally cramped confines or elsewhere where space is premium or maneuverability is paramount, wherein an endless windrow of compost material is shown extending endlessly ahead of and behind the driving lane occupied by the inventive windrow-compost vehicle for illustration purposes.
Figure 2:
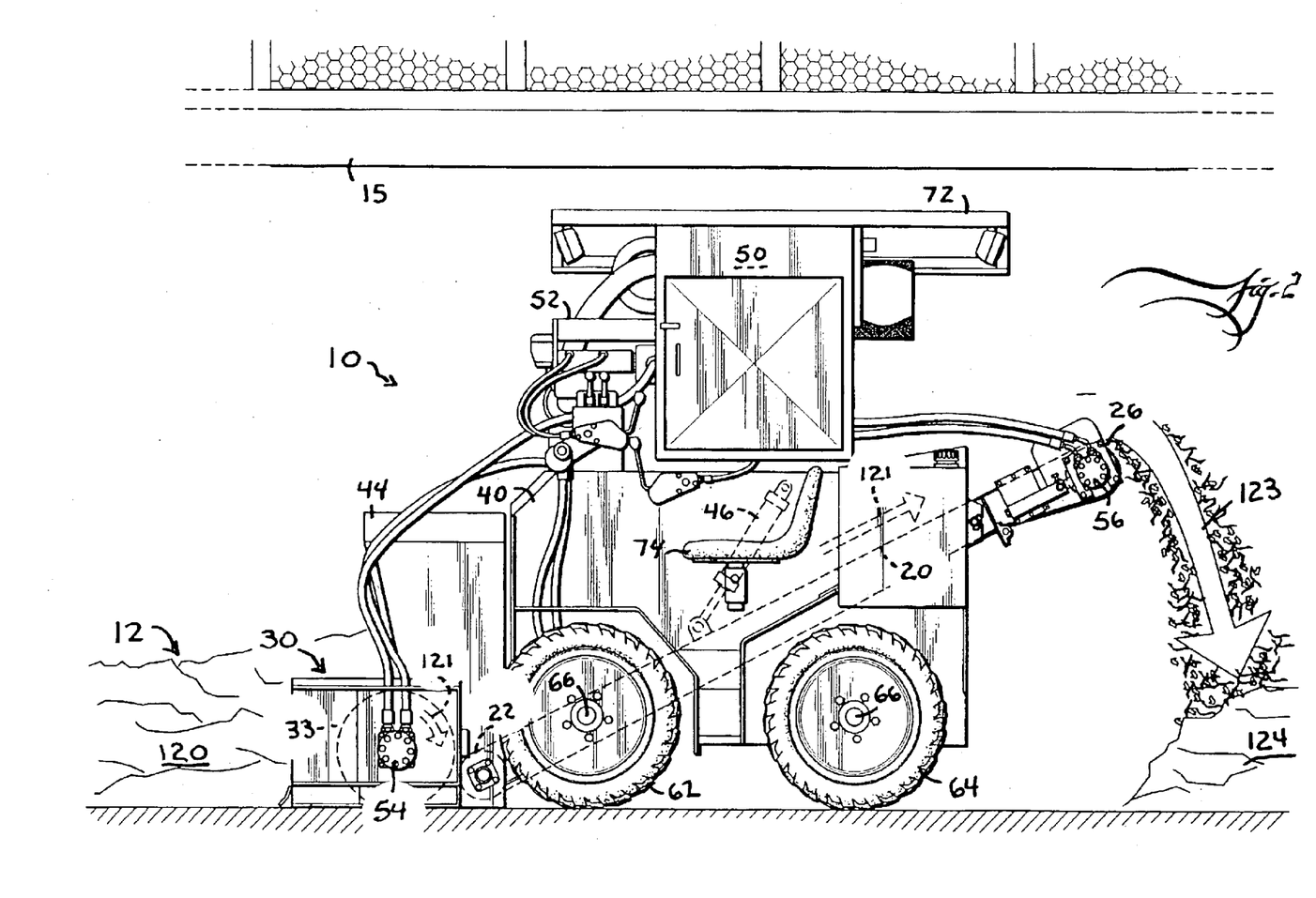
FIG. 2 is a side elevational view thereof including depiction of an example ceiling for illustration purposes.

The drawings show a compact vehicle 10 in accordance with the invention for composting windrows (eg., 12) of compost material found in exceptionally cramped confines or elsewhere where space is premium or maneuverability is paramount. FIGS. 1 and 2 show an endless windrow 12 of compost material having a section 120 extending endlessly ahead of the vehicle 10 and another section 124 back-deposited behind vehicle 10 in the driving lane previously driven-through by the inventive windrow-compost vehicle 10. FIG. 2 further includes depiction of sections 121 of material in-transit through the vehicle 10 as well as a cascade 123 of material discharged from the rear of the vehicle 10. FIG. 2 furthermore includes depiction of a low ceiling 15.

The compact windrow-compost vehicle 10 in accordance with the invention is preferably built upon a rugged heavy-duty steel frame 40, stainless steel being most preferred. The overall height and width can be varied to meet the specifications of various use environments. Generally, in the case of the high-rise bird houses, the overall width is preferably in the range between six to ten feet (1.8 to 3 m). The overall height being about a half foot (~15 cm) short of or less than the expected ceiling heights of either seven or eight feet (~2.1 or 2.4 m).

FIGS. 1 and 2 allow the following preliminary, very general-level discussion of the operative plan-of-attack of the vehicle 10. The vehicle 10 has a pick-up front-end 30 (eg., "pick-up" in the vacuum or scoop-up sense) . The pick-up front-end 30 attacks into the windrow section 120 ahead from a direct end-on attack or, that is, right down the center of the track of the windrow 12 (ie., the windrow 12's long axis). Among other things (to be more particularly discussed below), the pick-up front-end 30 digs up the ahead-portions of the windrow 121 and deposits what it digs up 121 on an intake end 22 of a ramped conveyor belt 20. The ramped conveyor belt 20 has an inclined material-carrying run 24 that extends between the aforementioned lower intake end 22 and an upper discharge end 26. The picked-up material 121 deposited on the conveyor 20's intake end 22 is ultimately ejected rearwardly from the discharge end 26 as a cascade 123 in straight alignment with the middle of the track (eg., 120 continuing through 124) from which it was picked up, whereby the vehicle 10 leaves the material in a well-formed windrow 124 as shown in FIG. 1. Indeed, the material to-be-dug up 120 ahead of the vehicle 10 might be back-deposited behind the vehicle 10 in a neater, more well-formed windrow 124 than it originally was found.

FIG. 2 shows this significant aspect of the invention. In fairly simple terms, the vehicle 10 carves out a void for itself in the track of the windrow 12 (eg., the void being delimited between windrow sections 120 and 124). The vehicle 10 hence drives through this temporary (and traveling) void the vehicle 10 creates (again, the void being delimited between windrow sections 120 and 124). In more difficult language, the inventive compact windrow-compost vehicle 10 has a wheelbase defined by front and back wheels 62 and 64. The pick-up front-end 30 is situated ahead of the front wheels 62. The conveyor 20's discharge end 26 is situated behind the back wheels 64. Hence the vehicle 10 is afforded the ability to drive right down the center of the track of the windrow 12 because the material 120 which would otherwise block the vehicle is in transit (eg., 121) through the material-handling features of the vehicle 10, namely the pick-up front-end 30 and the flow-through conveyor belt 20. To say it more simply once again, the wheels 62 and 64 can drive directly on the concrete floor originally covered over by the ahead sections 120 of material because the material 120 which was moments ago just laying there is now somewhere being digested in the internal "digestion" system of the of the vehicle (eg., indicated by 121), ultimately to be discharged out the vehicle 10's rear end (eg., indicated by 123) vis-a-vis the conveyor 20's discharge end 26. In this way the vehicle 10 can be likened to a worm tunneling through soil. A worm ingests the soil in front of it to ultimately excrete or discharge that soil immediately behind it as it (the worm) tunnels its way through the soil. Likewise, the inventive vehicle 10 "ingests" the material 120 in front of it to ultimately discharge that material (as indicated by 123) immediately behind it in windrow section 124 as it (the vehicle 10) digs its way through the material 12.

To do this right, the mass throughput of the vehicle 10 (in units of, eg., lbs/sec) ought to be selected to equal a product of the speed of the vehicle 10 (eg., in ft/sec) times the mass distribution of the material 120 dug through (eg., in lbs/linear feet of the material section 120).

To turn attention more particularly on the pick-up front-end 30, it comprises a center-flow auger system 31. That is, the center-flow auger system 31 has a single shaft on which are mounted opposed left and right sections of helical flighting 33 coiled in respectively opposite directions. The common shaft is driven by a hydraulic drive 54 to rotate at, for example, about 220 r.p.m. Hence the turning augers 33 present a heavy-duty front-end 30 for attacking into, breaking apart and digging up the material 120 they encounter. The opposite-direction flighting of the left and right auger sections 33 achieves, in unison, motivation of the dug-into manure 121 from the outboard extremes thereof to the center of the front-end 30 in spite of being mounted on a common shaft, which shaft for example is rotated clockwise from the viewpoint shown by FIG. 2. The augers 33's common shaft further includes a central section of paddles 35 for kicking the manure 121 supplied thereto backwardly and upwardly onto the intake end 22 of the conveyor 20 (eg., as can be reckoned with reference to FIGS. 1 and 2).

Other aspects of the pick-up front-end 30 include the following. The pick-up front-end 30 has left and right flaring wings 37 or deflectors for deflecting or funneling manure 121 on the extreme edges of the pick-up front-end 30 into the left and right helixes 33 of the auger flights as shown. The wings 37 protrude outwardly sufficiently to shield the left-side bearing and motor assembly 54 on the left side, or the right-side bearing only on the right side, respectively. The pick-up front-end 30 further has left and right scoop 39 sections trailing immediately behind the respective left and right auger sections 33 for scraping- or scooping-up any remnants of material 121 and shoving it into the whirl of the auger sections 33. The left and right scoop-sections 39 have upper terminations disposed against left and right backplates 42 that flank a central hooded portion 44. Altogether, the wings 37 and the scoop-sections 39, as well as the backplates 42 and hooded portion 44, cooperate together to funnel the dug up and broken apart manure 121 into the central paddles 35 which eventually deposit such intake of manure 121 onto the intake end 22 of the flow-through conveyor 20. It is an object of the invention that during this process the picked-up manure 121 is disintegrated and/or stirred by the combined effects of the auger sections 33 and their surrounding shields 37 and 39 such that by the time the picked-up manure 121 is deposited on the conveyor 20 it is fairly well "aerated."

The pick-up front-end 30 can be produced in various widths. Preferably the pick-up front-end 30 can be raised and lowered between non-use and deployed extremes, respectively, by means of hydraulic cylinders 46. That way, the pick-up front-end 30 is lifted to a non-use or retracted position when motoring the vehicle 10 between jobs so as not to damage the front-end 30 or the sharp edge of its scoop-sections 39 on low obstacles on a rough drive-surface.

Again, various aspects of the pick-up front-end 30 include the center-flow auger system 31 that digs into and breaks apart the manure 120, as well as moreover stirs or agitates the picked-up manure 121 all while concurrently motivating that manure 121 to the center of the front-end 30 where such manure 121 is deposited onto a lower intake end 22 of the flow-through belt system 20. The flow-through conveyor 20 belt is hydraulically driven by motor 56. The conveyor 20 receives the manure 121 from the center of the center-flow auger system 31 on its intake end 22 and transports that manure 121 through a central tunnel in the frame 40 of the vehicle 10 to a discharge end 26. The discharge end 26 has a preferred height of approximately four feet (1.2 m) high, and from this discharge end 26 the manure 121 is preferably ejected in a way (eg, such as a cascade 123) to be allowed to fall back into a well-formed windrow formation 124, fairly similar to the undisturbed windrow section 120 except turned and stirred and so on. Again, the material to-be-dug up 120 ahead of the vehicle 10 might be back-deposited behind the vehicle 10 in a neater, more well-formed windrow 124 than it originally was found.

Figure 4:
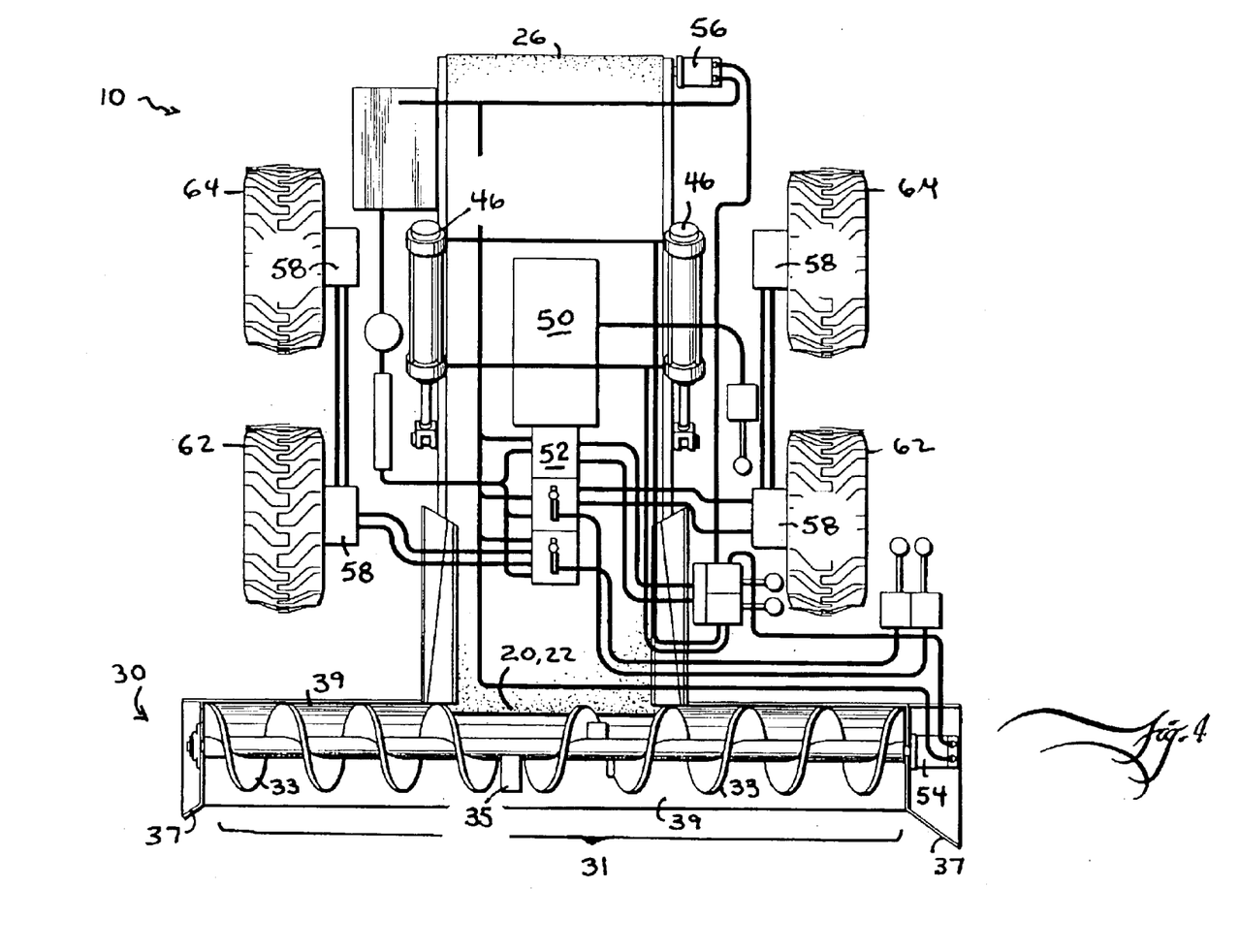
FIG. 4 is a top plan view thereof, partly in schematic to better show aspects of the hydraulic system.

The vehicle 10 is preferably self-powered, and this can be achieved by any suitable power or drive system of motors or engines 50 including without limitation a preferred power or drive system comprising a diesel power plant. The diesel engine 50 preferably ranges between twenty-five to fifty horsepower. The diesel engine 50 drives a main hydraulic pump 52 that provides all of the hydraulic power necessary to operate all the various hydraulic-powered devices on the vehicle 10 as a whole. Aspects of the hydraulic system are more particularly shown by FIG. 4. That is, the main hydraulic pump 52 driven by the diesel motor 50 supplies the hydraulic power required by the auger drive 54, the conveyor drive 56, the drives 58 of each of the four wheels 62 and 64, and any of various other drives and cylinders including the cylinders 46 which lift and drop the pick-up front-end 30.

The frame 40 of the vehicle 10 (excluding the pick-up front-end 30 and conveyor 20) forms an inverted-U shaped tunnel. This inverted-U shaped tunnel defines an open-bottomed passageway inside of which is mounted the flow-through conveyor 20. The inverted-U shaped tunnel defines left and right flange sections on which are mounted left and right stub-axles 66 for front wheels 62 and left and right stub-axles 66 for rear wheels 64. It is significant that at least the front wheels 62 are not mounted on a common axle because such a common axle (none is shown in the drawings) would presumptively interfere with the flow-through conveyor 20 that occupies the inverted-U shaped tunnel's open-bottomed passageway. It is also significant that the left- and right-side wheel drives 58 of both the front and back counterparts are mounted independent because it is desirable to drive them as independently as practicable. That way, better maneuverability is achievable. Indeed, optimum maneuverability is achieved by short as wheelbase as possible, as well as compact as lateral span between left and right counterparts, in combination with independent drive 58 for each.

In a preferred drive system 50 for the vehicle 10, each wheel 62 and 64 has its own hydraulic drive motor 58. Hence the drawings show four hydraulic drive motors 58 for the four wheels 62 and 64. Preferably forward and reverse movement of the wheels 62 and 64 is controlled in left and right pairs. Each of the left and right side wheels are individually controlled from the driver's seat 74 by control levers. Hydraulic power is delivered to the hydraulic motors 58 from the hydraulic pump 52. Thus the drive of the wheels 62 and 64 is independent of the hydraulic drive of the augers 33 and/or the conveyor 20. That way, the vehicle 10 is nimbly maneuverable by virtue of hydraulic-power delivery to individual motors 58 on each wheel 62 and 64 that allow forward movement on one side and backward movement on the other side. This arrangement of things affords the extremely tight turning capability required in the confined quarters of the intended use environment including without limitation high-rise chicken houses.

Figure 3:
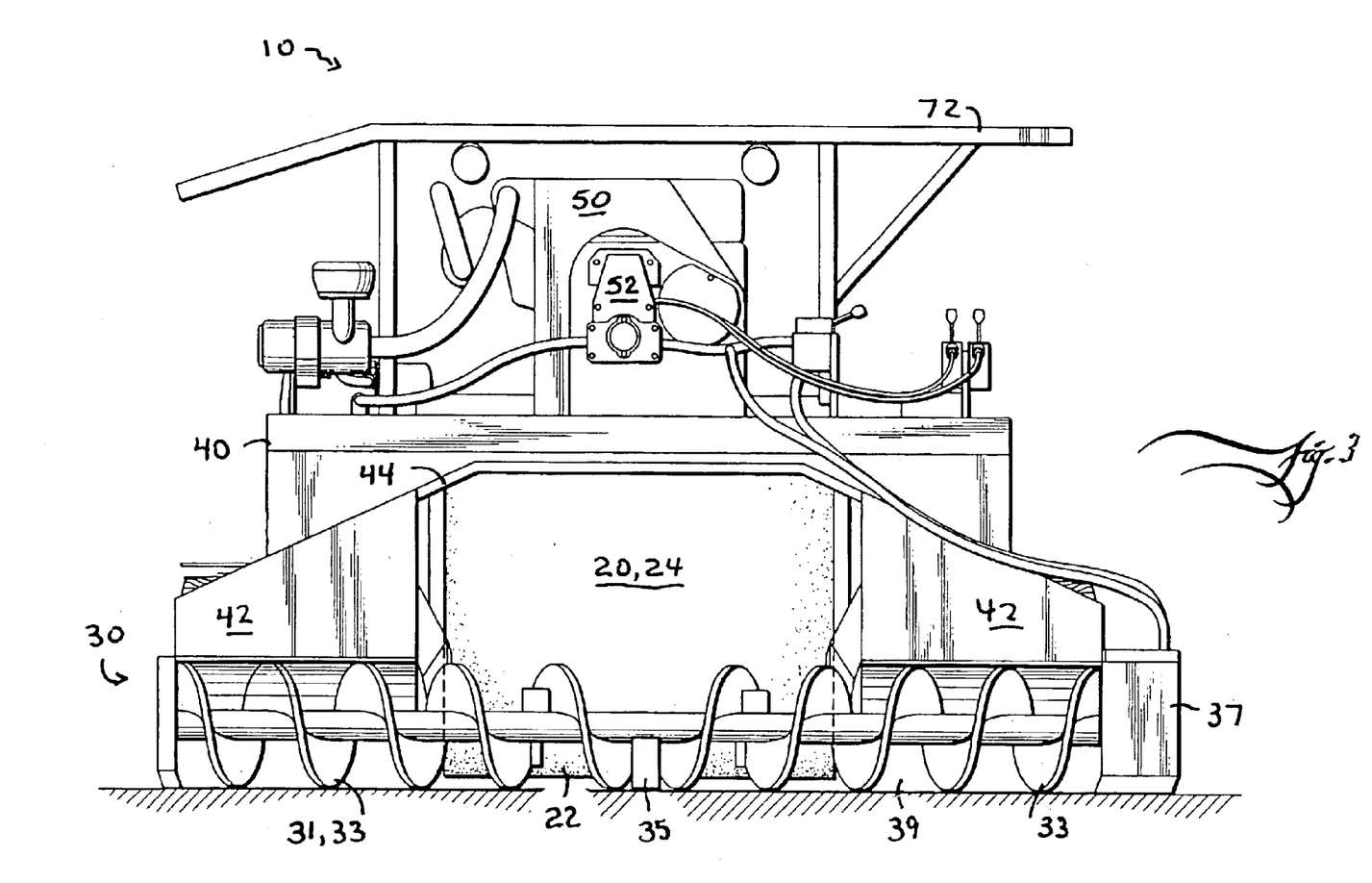
FIG. 3 is an enlarged front elevational view thereof, wherein the windrow is removed for sake of clarity.

Since the vehicle 10 is intended to be operated in low ceiling environments (eg., a ceiling indicated as 15 in FIG. 2), a roof 72 is provided for covering both the driver's seat 74 and engine 50. As previously mentioned, the frame 40 of the vehicle 10 substantially comprise an inverted-U shaped tunnel. The conveyor 20 is disposed to occupy this open-bottomed passageway defined through this inverted-U shaped tunnel. Correspondingly, the engine 50 and driver's seat 74 as well a majority of the hydraulic system (eg, 52 and so on) are mounted on the outside of this inverted-U shaped tunnel but under the roof 72's eaves. Hence the diesel motor 50 and the main hydraulic pump 52 are mounted on a top deck of the inverted-U shaped tunnel, while the driver's seat 74 is situated nested closely against one side (eg., the left side in the drawings). FIG. 3 shows that the roof 72 is not wider than the pick-up front-end 30. The entire roof 72 may be removed for maintenance and repair of the engine 50 or hydraulic pump 52.

Preferably the flow-through belt assembly 20 and pick-up front-end 30 can be detachably-attached together to form a single entity for lifting purposes. That is, the flow-through belt assembly 20 is pivoted at its back (and, eg., top) end 26 so that it can be pivoted with the use of the hydraulic cylinders 46 located at the lower end of the flow-through belt assembly 20. Lifting the flow-through belt assembly 20 likewise lifts ups the pick-up front-end 30 into a non-use position so that the vehicle 10 can be driven between jobs without stubbing and damaging the pick-up front-end 30. In particular, lifting the flow-through conveyor 20 lifts the auger system 31 as well as the wings 37 and scoop-sections 39. In an alternate version of the invention (not shown), the flow-through conveyor is eliminated, and thus the center-flow auger may be utilized to toss the material 121 through the central tunnel of vehicle 10, to deposit that material in a windrow 124 without the use of any flow-through belt system.

Given the foregoing, the present invention provides a method for turning and aerating manure or other compost materials in a windrow configuration 12. This is accomplished by means of a four-wheel drive, hydraulic, self-propelled vehicle 10 with a seat 74 for an operator to control the speed of the auger system 31 and conveyor 20 as well as the drive motors 54 of the wheels 62 and 64 of the vehicle. The invention is particularly designed to be utilized in the lower level of a high-rise poultry house. The vehicle 10 can break apart and dig up the settled windrows 120 of manure dropped by the birds from above. The inventive vehicle 10 can be driven through the windrows 120 on a regular schedule, breaking apart and digging up the manure 120, enhancing compost decomposition, reducing insect plagues, decreasing ammonia levels, and in all creating a better environment. The vehicle 10 is substantially hydraulic powered and the main hydraulic pump 52 therefor is driven by a fuel-fired engine 50. The vehicle 10 is intentionally compact and facilitates interchangeable attachment with auger-characterized front ends or heads 30 selected from a selection of widths. Such auger-characterized front ends or heads 30 operate to initially break apart and dig up the windrow 120 and move the dug-up material 121 to a center of the auger system 31. This process disintegrates and/or stirs the material 121, introducing much-needed oxygen to the material 121 that is necessary for dehydration and decomposition. The center of auger system 31 is characterized by paddles 35 which kick up or otherwise propel the material/manure 121 onto the intake end 22 of the flow-through conveyor 20. The conveyor 20 conveys such material 121 upward toward a rear discharge end 26 from which the manure is ejected in a cascade 123. The ejected manure 123 from the discharge end 26 falls through the air, perhaps disintegrating or fluffing apart even further or else being more completely exposed to air before landing on the floor in more or less the same windrow configuration 124 in which it originally sat before being dug up. The invention is able to dig up and break apart material situated in courses as for example windrows 120, aerate and back-deposit such material 12 in a comparable windrow formation 124 in which it was found, thus enhancing compost decomposition process. Aspects of the pick-up front-end 30 include that it is capable of scraping up and processing material 120 right down to the cement floor and thereafter thoroughly stirring it up/disintegrating it during the process. Back-depositing the material 12 into the preferred windrow formation 124 is significant both for successive uses of the machine through the windrow pile 12 as well as the decomposition process itself in that the windrow shape 124 greatly facilitates low temperature composting. The invention as constructed advantageously drives through restrictive spaces less than seven feet (2.1 m) high and six feet (~1.8 m) wide but adequately attacks windrows up to four feet (1.2 m) high.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A vehicle for driving straight down the center of the longitudinal track of an elongated windrow of compost material and providing composting service along the way, said vehicle comprising:

a front-end auger-system, arranged on a shaft system oriented generally horizontal or parallel to the ground or drive surface, having left and right lateral extremes and, between which extremes, comprising a transfer section and an auger section for cooperatively attacking into and digging up the windrow material that said vehicle drives said front-end system into, wherein the auger section additionally laterally motivates material to the transfer section;

a conveyor having a material-carrying run extending between an intake end situated to receive material from the transfer section of the auger-system and a discharge end situated to back-deposit the material on the ground or drive surface behind the vehicle in a windrow formation generally centered on the longitudinal track that the vehicle drives down;

a wheelbase defined by and comprising at least three ride wheels including at least one of which comprises a drive wheel, said wheelbase being sized and arranged laterally narrower than the lateral extremes of the front-end auger system and longitudinally shorter than a span between the front-end auger system and where the material discharged from the discharge end is back-deposited on the ground or drive surface;

a frame for supporting the front-end auger-system, conveyor and wheels;

a source supplying drive power to the drive wheel, conveyor and auger-system; and forwardly flaring-out left and right wings to append to the left and right extremes respectively of the front-end auger-system for protecting devices outboard of the front-end auger-system's left and right extremes including shaft bearings and devices incorporated in the supply of drive power to the front-end auger-system.

2. The vehicle of claim 1 wherein said auger-system comprises an intermediate transfer section flanked by left and right oppositely-coiled auger sections all mounted on a common shaft.

3. The vehicle of claim 2 wherein said transfer section comprises paddles for kicking dug up material onto the intake end of the conveyor.

4. The vehicle of claim 1 wherein said conveyor has a lateral expanse between left and right edges thereof.

5. The vehicle of claim 4 wherein said wheels include at least left and right front wheels arranged to be straddling said left and right edges of the conveyor.

6. The vehicle of claim 5 wherein said frame provides left and right structural supports for mounting the left and right front wheels respectively, which structural supports are sized and arranged to occupy positions laterally narrower than the lateral extremes of the front-end auger-system and straddling said left and right edges sides of the conveyor.

7. The vehicle of claim 6 wherein said frame comprises a top deck and left and right lateral flanges depending from the top deck to cooperatively define and inverted-U shaped tunnel through the longitudinal middle of the vehicle, said tunnel providing clearance for the conveyor and said flanges providing for mounting of at least the front wheels.

8. A vehicle for driving straight down the center of the longitudinal track of an elongated windrow of compost material and providing composting service along the way, said vehicle comprising:

a front-end auger-system, arranged on a shaft system oriented generally horizontal or parallel to the ground or drive surface, having left and right lateral extremes and, between which extremes, comprising a transfer section and an auger section for cooperatively attacking into and digging up the windrow material that said vehicle drives said front-end system into, wherein the auger section additionally laterally motivates material to the transfer section;

a conveyor having a material-carrying run extending between an intake end situated to receive material from the transfer section of the auger-system and a discharge end situated to back-deposit the material on the ground or drive surface behind the vehicle in a windrow formation generally centered on the longitudinal track that the vehicle drives down;

a wheelbase defined by and comprising at least three ride wheels including at least one of which comprises a drive wheel, said wheelbase being sized and arranged laterally narrower than the lateral extremes of the front-end auger system and longitudinally shorter than a span between the front-end auger system and where the material discharged from the discharge end is back-deposited on the ground or drive surface;

a frame for supporting the front-end auger-system, conveyor and wheels: and a source supplying drive power to the drive wheel, conveyor and auger-system;

wherein said wheels comprise at least two drive wheels arranged laterally opposite left and right of each other, said source for supplying drive power being arranged to supply each drive wheel drive power independently of the other drive wheel whereby steering of said vehicle can be achieved by power to one wheel while braking the other.

9. A vehicle for driving straight down the center of the longitudinal track of an elongated windrow of compost material and providing composting service along the way, said vehicle comprising:

a front-end auger-system, arranged on a shaft system oriented generally horizontal or parallel to the ground or drive surface, having left and right lateral extremes and, between which extremes, comprising a transfer section and an auger section for cooperatively attacking into and digging up the windrow material that said vehicle drives said front-end system into, wherein the auger section additionally laterally motivates material to the transfer section;

a conveyor having a material-carrying run extending between an intake end situated to receive material from the transfer section of the auger-system and a discharge end situated to back-deposit the material on the ground or drive surface behind the vehicle in a windrow formation generally centered on the longitudinal track that the vehicle drives down;

a wheelbase defined by and comprising at least three ride wheels including at least one of which comprises a drive wheel, said wheelbase being sized and arranged laterally narrower than the lateral extremes of the front-end auger system and longitudinally shorter than a span between the front-end auger system and where the material discharged from the discharge end is back-deposited on the ground or drive surface;

a frame for supporting the front-end auger-system, conveyor and wheels; and a source supplying drive power to the drive wheel, conveyor and auger-system;

wherein said vehicle drives over a temporary cleaned-up space on the ground or drive surface that said vehicle creates because such is needed by the vehicle to be capable of driving down the center of the longitudinal track of the elongated windrow, which cleaned-up space is temporary and traveling at the same speed of travel of the vehicle by virtue of the material being picked-up by the front-end auger-system being back-deposited in comparable measure behind the vehicle and hence left behind on the ground or drive surface in a windrow formation comparably as originally encountered;

wherein at any given moment the missing material which would have originally formed the windrow section in the temporary and traveling cleaned-up space is substantially accounted for by the sum of material riding on the material-carrying run of the conveyor at that moment.

10. The vehicle of claim 9 wherein said conveyor's intake end is disposed at or near the elevation of the ground or drive surface as said conveyor's discharge end is disposed at a substantially higher elevation such that the material-carrying run thereof defines an inclined ramp between the intake and discharge ends, said discharge end discharging material in an arcing cascade behind said vehicle.

11. A composting vehicle capable of driving straight down the center of the longitudinal track of an elongated windrow of compost material by driving over a temporary cleared-out space on the ground or drive surface said vehicle creates in the process, said vehicle comprising:

a conveyor system having a material-carrying run extending between an intake end and a discharge end:

a pick-up front-end, extending laterally between left and right extremes, arranged in a forward position for said vehicle and in a position to skim the ground or drive surface in order to pick-up or dig-into material which said vehicle drives said pick-up front-end over or into as well as to deposit such picked-up or dug-into material on the conveyor system's intake end, wherein said discharge end is situated to back-deposit such deposited material out onto the ground or drive surface behind the vehicle in a windrow formation generally centered on the longitudinal track that said vehicle drives down;

a wheel system comprising at least three ride wheels, at least one of which is also a drive wheel, said wheel system being sized and arranged to be generally laterally narrower than the lateral extremes of the pick-up front-end and longitudinally shorter than a span between the pick-up front-end and where the material discharged from the discharge end is back-deposited on the ground or drive surface;

a frame for supporting the pick-up front-end, conveyor system and wheels; and a source supplying drive power to the drive wheel, conveyor system and pick-up front-end;

wherein said pick-up front-end comprises an auger-system comprising both a transfer section and an auger section for cooperatively picking up or digging into windrow material which said vehicle drives said pick-up front-end over or into, said auger section additionally laterally motivating material to the transfer section, said transfer section depositing material to the intake end of the conveyor system;

wherein said pick-up front-end further comprises forwardly flaring-out left and right wings appended to left and right extremes respectively of the auger-system for protecting devices outboard of the auger-system's left and right extremes including shaft bearings and devices incorporated in the supply of drive power to the pick-up front-end.

12. A composting vehicle capable of driving straight down the center of the longitudinal track of an elongated windrow of compost material by driving over a temporary cleared-out space on the ground or drive surface said vehicle creates in the process, said vehicle comprising:

a conveyor system having a material-carrying run extending between an intake end and a discharge end;

a pick-up front-end, extending laterally between left and right extremes, arranged in a forward position for said vehicle and in a position to skim the ground or drive surface in order to pick-up or dig-into material which said vehicle drives said pick-up front-end over or into as well as to deposit such picked-up or dug-into material on the conveyor system's intake end, wherein said discharge end is situated to back-deposit such deposited material out onto the ground or drive surface behind the vehicle in a windrow formation generally centered on the longitudinal track that said vehicle drives down;

a wheel system comprising at least three ride wheels, at least one of which is also a drive wheel, said wheel system being sized and arranged to be generally laterally narrower than the lateral extremes of the pick-up front-end and longitudinally shorter than a span between the pick-up front-end and where the material discharged from the discharge end is back-deposited on the ground or drive surface;

a frame for supporting the pick-up front-end, conveyor system and wheels; and a source supplying drive power to the drive wheel, conveyor system and pick-up front-end;

wherein the temporary cleared-out space on the ground or drive surface that said vehicle creates to drive over is both temporary and traveling at the same speed of travel of the vehicle by virtue of the material that is picked-up by the pick-up front-end is ultimately back-deposited in comparable measure behind the vehicle;

wherein at any given moment the missing material which would have originally formed the windrow section in the temporary and traveling cleared-out space is substantially accounted for by the sum of material in transit on or through the material-carrying run of the conveyor system at that moment.

13. The vehicle of claim 12 wherein said pick-up front-end comprises an auger-system comprising both a transfer section and an auger section for cooperatively picking up or digging into windrow material which said vehicle drives said pick-up front-end over or into, said auger section additionally laterally motivating material to the transfer section, said transfer section depositing material to the intake end of the conveyor system.

14. The vehicle of claim 13 wherein said auger-system comprises an intermediate transfer section flanked by left and right oppositely-coiled auger sections all mounted on a common shaft.

15. The vehicle of claim 14 wherein said transfer section comprises paddles for kicking dug up material to the intake end of the conveyor system.

16. The vehicle of claim 12 wherein said conveyor system has a lateral expanse between left and right edges; and, said wheels include at least left and right front wheels arranged straddling said left and right edges of the conveyor system.

17. The vehicle of claim 16 wherein said frame provides left and right structural supports for mounting the left and right front wheels respectively, which structural supports are sized and arranged to occupy positions laterally narrower than the lateral extremes of the pick-up front-end and straddling said left and right edges sides of the conveyor system.

18. The vehicle of claim 17 wherein said frame comprises a top deck and left and right lateral flanges depending from the top deck to cooperatively define an inverted-U shaped tunnel through the longitudinal middle of the vehicle, said tunnel providing clearance for the material-carrying run of the conveyor system and said flanges providing for mounting of at least the front wheels.

19. The vehicle of claim 12 wherein said wheels comprise at least two drive wheels arranged laterally opposite left and right of each other, said source for supplying drive power being arranged to supply each drive wheel drive power independently of the other drive wheel whereby steering of said vehicle can be achieved by power to one wheel while braking the other.

20. The vehicle of claim 12 wherein said conveyor system's intake end is disposed at or near the elevation of the ground or drive surface as said conveyor system's discharge end is disposed at a substantially higher elevation such that the material-carrying run thereof defines an inclined ramp between the intake and discharge ends, said discharge end discharging material in an arcing cascade behind said vehicle.

21. A composting vehicle capable of driving straight down the center of the longitudinal track of an elongated windrow of compost material by driving over a temporary cleared-out space on the ground or drive surface said vehicle creates in the process, said vehicle comprising:

a conveyor system having a material-carrying run extending between an intake end and a discharge end;

a pick-up front-end, extending laterally between left and right extremes, arranged in a forward position for said vehicle and in a position to skim the ground or drive surface in order to pick-up or dig-into material which said vehicle drives said pick-up front-end over or into as well as to deposit such picked-up or dug-into material on the conveyor system's intake end, wherein said discharge end is situated to back-deposit such deposited material out onto the ground or drive surface behind the vehicle in a windrow formation generally centered on the longitudinal track that said vehicle drives down;

a left-side and right-side ride system for supporting the vehicle for longitudinal transit relative to the ground or drive surface, at least one of which is also driven, said left-side and right-side ride system being cooperatively sized and arranged to be generally laterally narrower than the lateral extremes of the pick-up front-end and longitudinally lesser than a span between the pick-up front-end and where the material discharged from the discharge end is back-deposited on the ground or drive surface;

a frame for supporting the pick-up front-end, conveyor system and left-side as well as right-side ride system; and a source supplying drive power to the driven one of the left-side or right-side ride system, the conveyor system and the pick-up front-end;

wherein said vehicle drives straight down a longitudinal track of an elongated windrow of compost material by virtue of the wheels being disposed in a temporary and traveling void created between the leading pick-up end and the discharge end of the conveyor whereby material that is picked-up by the leading pick-up end is ultimately back-deposited in about comparable measure behind the vehicle by the conveyor's discharge end.

22. A vehicle for composting windrows of compost material, comprising:

a conveyor system having a material-carrying run extending between an intake end and a discharge end;

a pick-up front-end, extending laterally between left and right extremes, arranged in a forward position for said vehicle and in a position to skim the ground or drive surface in order to pick-up or dig-into material which said vehicle drives said pick-up front-end over or into as well as to deposit such picked-up or dug-into material on the conveyor system's intake end, wherein said discharge end is situated to back-deposit such deposited material out onto the ground or drive surface behind the vehicle in a windrow formation generally centered on the longitudinal track that said vehicle drives down;

a left-side and right-side ride system for supporting the vehicle for longitudinal transit relative to the ground or drive surface, at least one of which is also driven, said left-side and right-side ride system being cooperatively sized and arranged to be generally laterally narrower than the lateral extremes of the pick-up front-end and longitudinally lesser than a span between the pick-up front-end and where the material discharged from the discharge end is back-deposited on the ground or drive surface;

a frame for supporting the pick-up front-end, conveyor system and left-side as well as right-side ride system; and a source supplying drive power to the driven one of the left-side or right-side ride system, the conveyor system and the pick-up front-end;

said pick-up front-end having an auger-system comprising both a transfer section and an auger section for cooperatively picking up or digging into material which said vehicle drives said pick-up front-end over or into, said auger section additionally laterally motivating material to the transfer section, said transfer section depositing material to the intake end of the conveyor system;

wherein said pick-up front-end further comprises forwardly flaring-out left and right wings appended to left and right extremes respectively of the auger-system for protecting devices outboard of the auger-system's left and right extremes including shaft bearings and devices incorporated in the supply of drive power to the pick-up front-end.

* * * * *